(12) United States Patent
Nicks

(10) Patent No.: US 10,139,795 B2
(45) Date of Patent: Nov. 27, 2018

(54) SYSTEM AND METHOD FOR ENVIRONMENTAL CONTROL SYSTEM DIAGNOSIS AND PROGNOSIS

(71) Applicant: The Boeing Company, Chicago, IL (US)

(72) Inventor: Eric L. Nicks, Defiance, MO (US)

(73) Assignee: The Boeing Company, Chicago, IL (US)

( * ) Notice: Subject to any disclaimer, the term of this patent is extended or adjusted under 35 U.S.C. 154(b) by 533 days.

(21) Appl. No.: 14/886,142

(22) Filed: Oct. 19, 2015

(65) Prior Publication Data

US 2017/0108841 A1 Apr. 20, 2017

(51) Int. Cl.
*G05B 19/042* (2006.01)
*G06T 7/00* (2017.01)
(Continued)

(52) U.S. Cl.
CPC ....... *G05B 19/042* (2013.01); *G05B 23/0235* (2013.01); *G05B 23/0283* (2013.01);
(Continued)

(58) Field of Classification Search
CPC .......... G05B 19/042; G05B 2219/2614; G05B 23/0235; G05B 23/0283; G06K 9/00671;
(Continued)

(56) References Cited

U.S. PATENT DOCUMENTS 6,845,306 B2 * 1/2005 Henry ................... B64D 41/00
701/29.6
7,068,301 B2 * 6/2006 Thompson ........ G06F 17/30017
348/141

(Continued)

FOREIGN PATENT DOCUMENTS

GB 2398771 9/2004

OTHER PUBLICATIONS

European Search Report, European Application No. 16194606.6, dated Feb. 17, 2017.

*Primary Examiner* — Chun Cao
(74) *Attorney, Agent, or Firm* — Perman & Green, LLP

(57) ABSTRACT

A method to provide prognosis and diagnosis of environmental control system maintenance. The method including imaging, with at least one imaging unit, in real time at least one portion of an environmental control system in operation, wherein real time images register a dynamic feature of a dynamic predetermined characteristic of the at least one portion of the environmental control system, comparing, with a controller, the real time images of the at least one portion of the environmental control system with stored images of the at least one portion of the environmental control system in operation to identify a change in the dynamic feature of the dynamic predetermined characteristic of the at least one portion of the environmental control system, and determining, with the controller, whether an abnormality exists in the at least one portion of the environmental control system based on the identified change in the dynamic feature between the real time images and the stored images of the at least one portion of the environmental control system.

20 Claims, 6 Drawing Sheets

(51) Int. Cl.
*G06K 9/00* (2006.01)
*G05B 23/02* (2006.01)

(52) U.S. Cl.
CPC ..... *G06K 9/00671* (2013.01); *G06K 9/00771* (2013.01); *G06T 7/001* (2013.01); *G05B 2219/2614* (2013.01); *G06T 2207/10016* (2013.01); *G06T 2207/30268* (2013.01)

(58) Field of Classification Search
CPC ...... G06K 9/00771; G06T 2207/30268; G06T 7/001; G06T 2207/10016; G06T 2207/30232
USPC ........................................................ 700/275
See application file for complete search history.

(56) References Cited

U.S. PATENT DOCUMENTS

| | | | |
|---|---|---|---|
| 7,702,435 B2 * | 4/2010 | Pereira | G05B 13/042 |
| | | | 701/30.8 |
| 2008/0204553 A1 * | 8/2008 | Thompson | G06F 17/30268 |
| | | | 348/143 |
| 2009/0110289 A1 | 4/2009 | Maggiore et al. | |
| 2009/0212976 A1 | 8/2009 | Pautsch et al. | |
| 2009/0309762 A1 | 12/2009 | Wolcken et al. | |
| 2013/0325286 A1 | 12/2013 | Lacaille | |

* cited by examiner

SYSTEM AND METHOD FOR ENVIRONMENTAL CONTROL SYSTEM DIAGNOSIS AND PROGNOSIS

BACKGROUND

The environmental control systems in, for example, the aerospace industry have evolved from early aviation days when, for example, aircraft were not pressurized and altitude was limited, to the state of the art environmental control and life support systems of today. The environmental control systems allow conversion of conditions outside, for example, the aircraft shell, to a comfortable environment inside the shell.

Generally, an aircraft includes one or more environmental control systems that include multiple fluid intakes, heat exchangers, compressors, expansion turbines and valves. In conventional environmental control systems the operational abnormalities or malfunctions with the environmental control system components are detected in various ways. As an example, existing solutions to detecting operational malfunctions with the environmental control system include installing threshold sensors (such as air quality or temperature sensors within the passenger cabin) on the aircraft where the environmental control system is shut down and switched to a backup environmental system when a threshold is reached. As another example, the passengers or crew of the aircraft are able to detect increased temperature within the passenger cabin of the aircraft which may indicate an operational malfunction with the environmental control system components.

Problems with the environmental control system may be difficult to diagnose, as proven by maintenance data where, for example, about 50% of the operational malfunctions are described as "general". Examples, of operational malfunctions are blocked heat exchangers, inoperable valves, fan degradation and/or icing of system components.

SUMMARY

A method to provide prognosis and diagnosis of environmental control system maintenance, the method including imaging, with at least one imaging unit, in real time at least one portion of an environmental control system in operation, wherein real time images register a dynamic feature of a dynamic predetermined characteristic of the at least one portion of the environmental control system, comparing, with a controller, the real time images of the at least one portion of the environmental control system with stored images of the at least one portion of the environmental control system in operation to identify a change in the dynamic feature of the dynamic predetermined characteristic of the at least one portion of the environmental control system, and determining, with the controller, whether an abnormality exists in the at least one portion of the environmental control system based on the identified change in the dynamic feature between the real time images and the stored images of the at least one portion of the environmental control system.

An apparatus to provide prognosis and diagnosis of environmental control system maintenance, the apparatus comprising: at least one imaging unit configured to capture real time images of at least one portion of an environmental control system in operation, where the real time images register a dynamic feature of a dynamic predetermined characteristic of the at least one portion of the environmental control system; and a controller connected to the at least one imaging unit, the controller being configured to compare the real time images of the at least one portion of the environmental control system with stored images of the at least one portion of the environmental control system in operation to identify a change in the dynamic feature of the dynamic predetermined characteristic of the at least one portion of the environmental control system, and determine whether an abnormality exists in the at least one portion of the environmental control system based on the identified change in the dynamic feature between the real time images and the stored images of the at least one portion of the environmental control system.

An aircraft environmental control system diagnostic system comprising: at least one video imaging unit disposed within the aircraft and being configured to capture real time images of at least one portion of an environmental control system, in operation, disposed within the aircraft, where the real time images register a dynamic feature of a dynamic predetermined characteristic of the at least one portion of the environmental control system; a memory including stored images of the at least one portion of the environmental control system in operation, the stored images corresponding to predetermined operational conditions of the at least one portion of the environmental control system; and a controller connected to the at least one video imaging unit and the memory, the controller being configured to compare the real time images of the at least one portion of the environmental control system with the stored images to identify a change in the dynamic feature of the dynamic predetermined characteristic of the at least one portion of the environmental control system, and determine whether an abnormality exists in the at least one portion of the environmental control system based on the identified change in the dynamic feature between the real time images and the stored images.

BRIEF DESCRIPTION OF THE DRAWINGS

Figure 1:
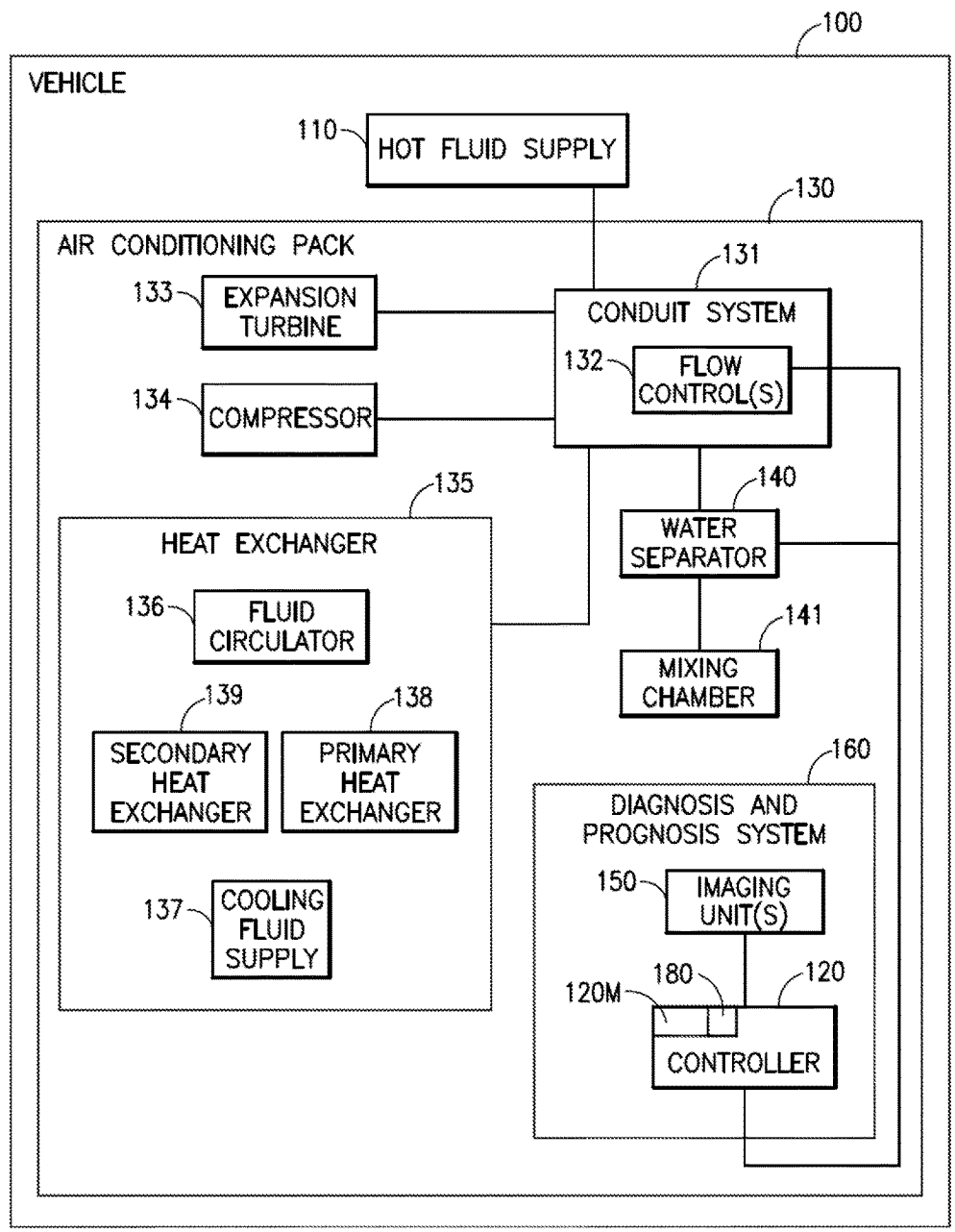
Figure 2:
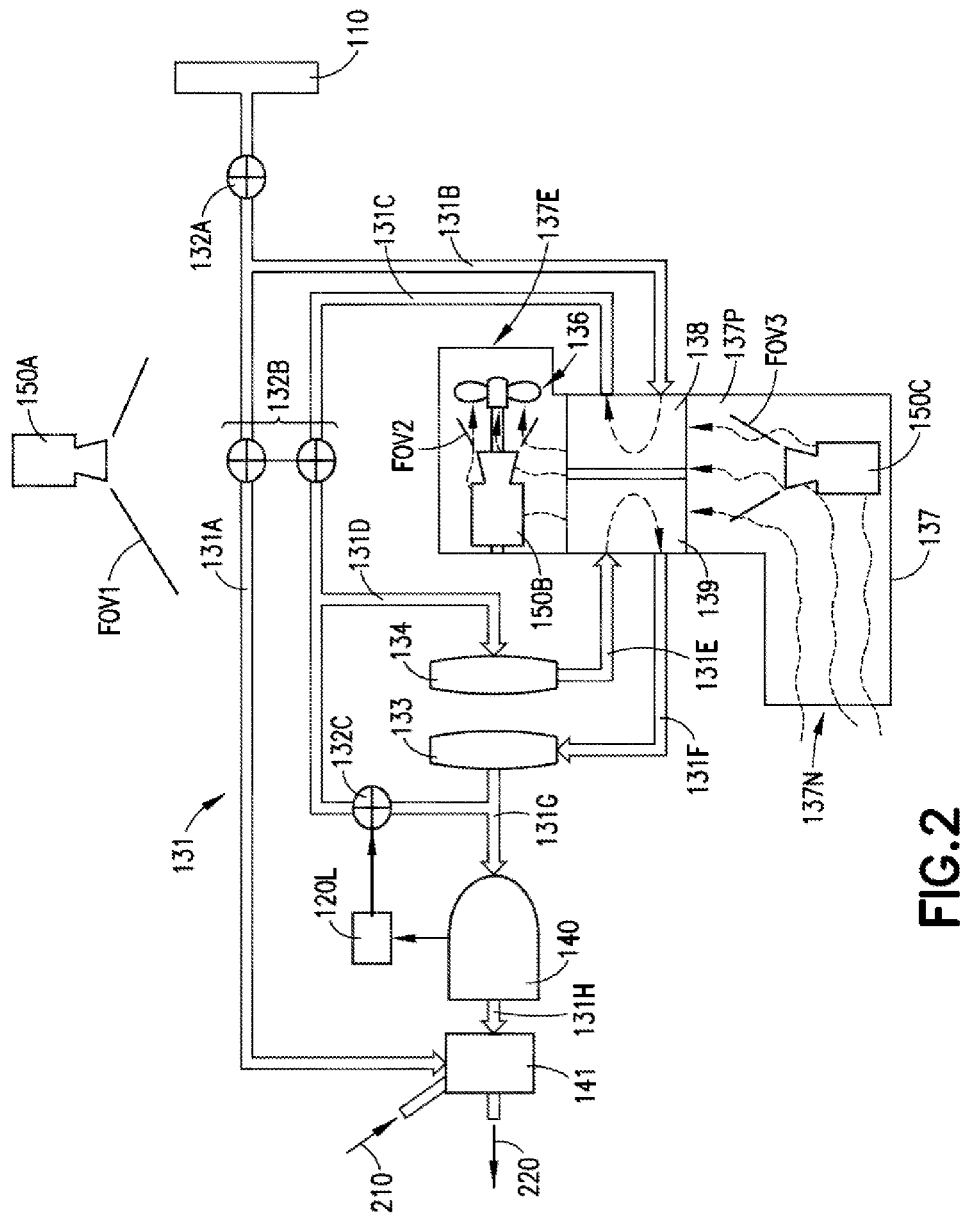
Figure 3:
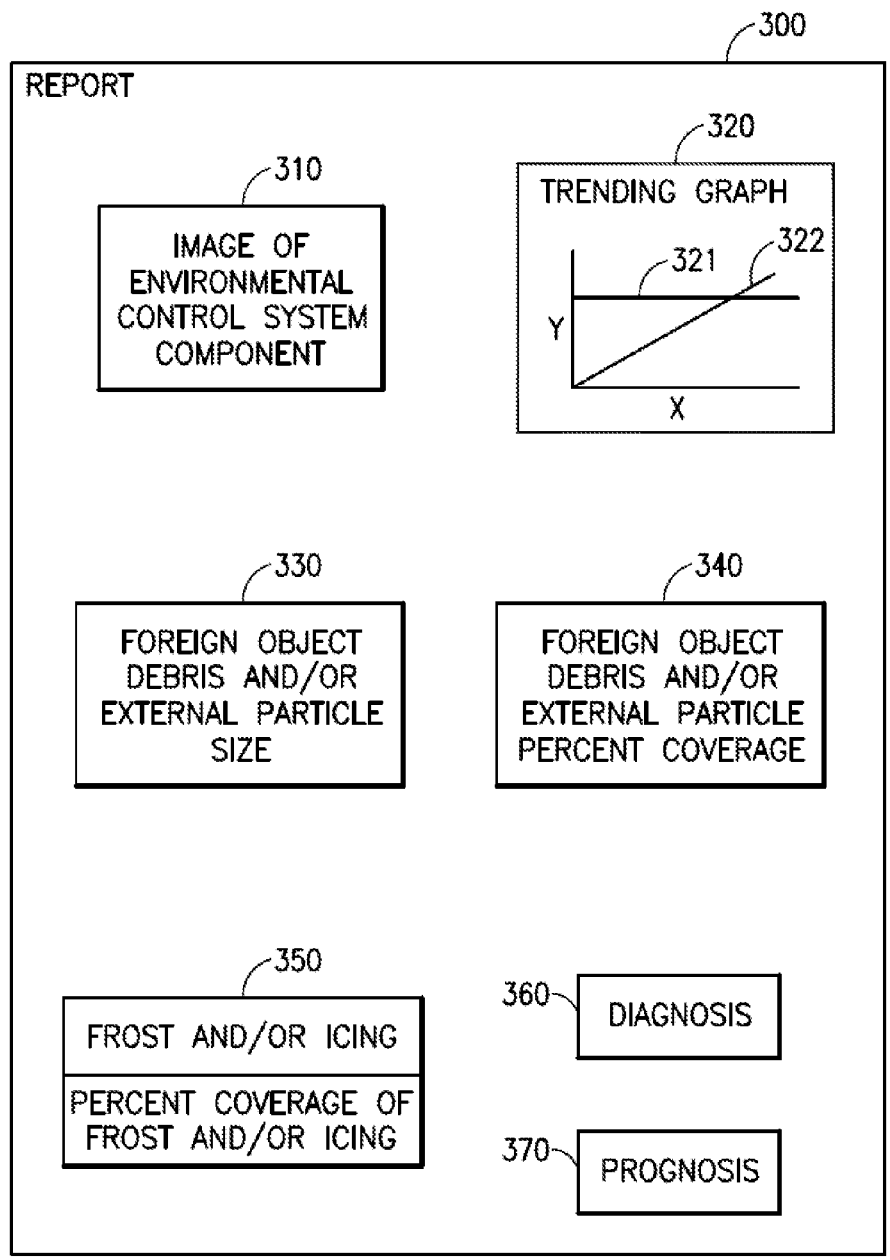
Figure 4:
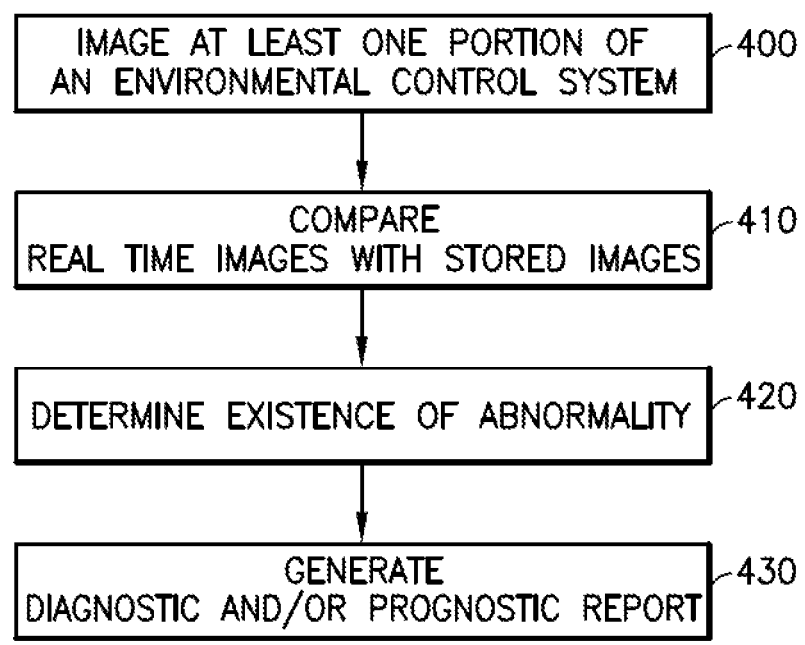
Figure 5:
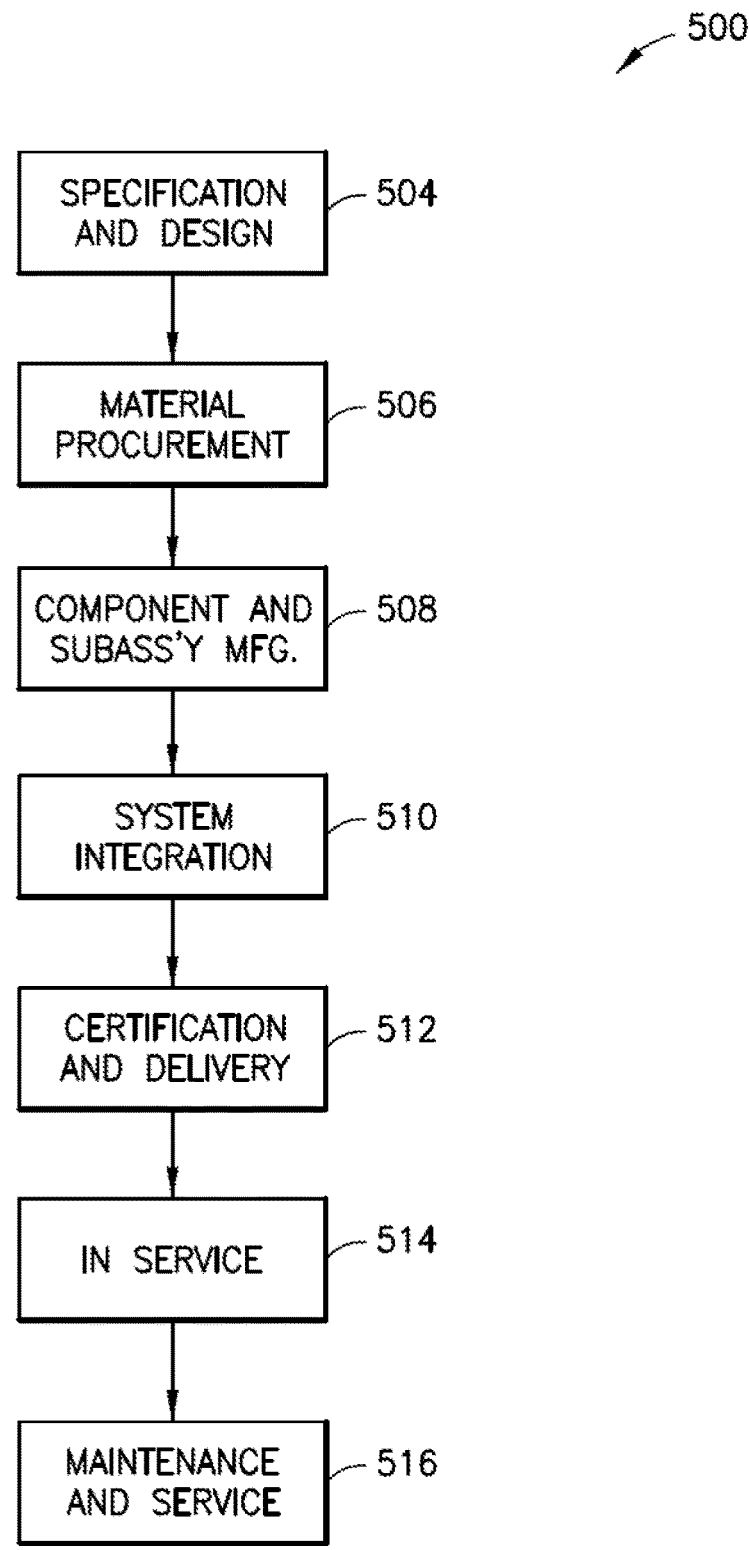

Having thus described examples of the disclosure in general terms, reference will now be made to the accompanying drawings, which are not necessarily drawn to scale, and wherein like reference characters designate the same or similar parts throughout the several views, and wherein:

FIG. 1 is a block diagram of an environmental control system including a diagnosis and prognosis system, according to one aspect of the present disclosure;

FIG. 2 is a diagrammatic representation of the environmental control system including the diagnosis and prognosis system, according to one aspect of the present disclosure;

FIG. 3 is a diagrammatic representation of a report, according to one aspect of the present disclosure;

FIG. 4 is a flow diagram for diagnosis and prognosis of the environmental control system, according to one aspect of the present disclosure;

FIG. 5 is a flow diagram of aircraft production and service methodology; and

Figure 6:
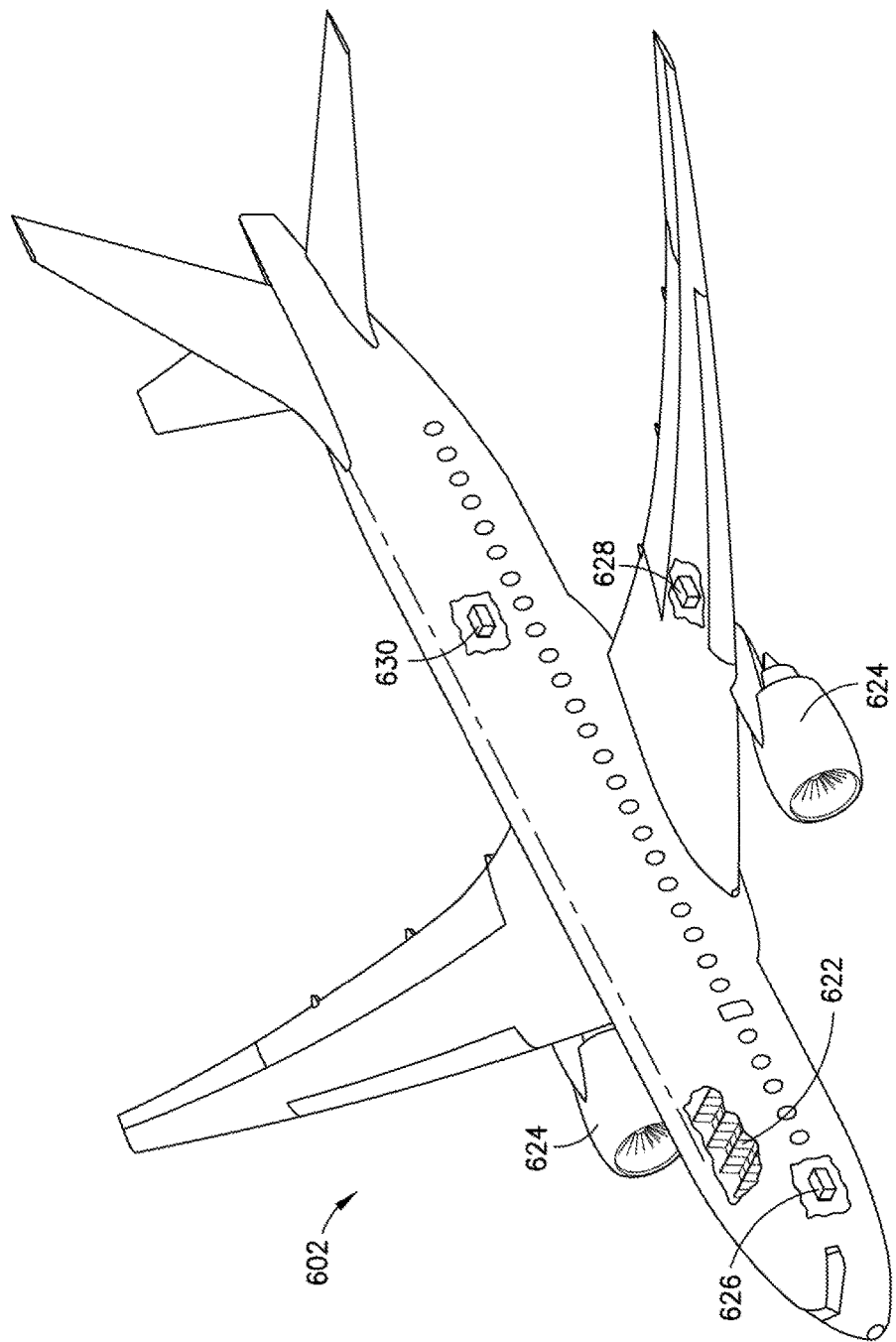

FIG. 6 is a diagrammatic representation of an aircraft including distributed vehicle systems.

In the block diagram(s) referred to above, solid lines, if any, connecting various elements and/or components may represent mechanical, electrical, fluid, optical, electromagnetic and other couplings and/or combinations thereof. As used herein, "coupled" means associated directly as well as indirectly. For example, a member A may be directly associated with a member B, or may be indirectly associated therewith, e.g., via another member C. Couplings other than those depicted in the block diagrams may also exist. Dashed lines, if any, connecting the various elements and/or components represent couplings similar in function and purpose to those represented by solid lines; however, couplings represented by the dashed lines may either be selectively provided or may relate to alternative or optional aspects of the disclosure. Likewise, elements and/or components, if any, represented with dashed lines, indicate alternative or optional aspects of the disclosure. Environmental elements, if any, are represented with dotted lines.

In the block diagram(s) referred to above, the blocks may also represent operations and/or portions thereof. Lines connecting the various blocks do not imply any particular order or dependency of the operations or portions thereof.

DETAILED DESCRIPTION

In the following description, numerous specific details are set forth to provide a thorough understanding of the disclosed concepts, which may be practiced without some or all of these particulars. In other instances, details of known devices and/or processes have been omitted to avoid unnecessarily obscuring the disclosure. While some concepts will be described in conjunction with specific examples, it will be understood that these examples are not intended to be limiting.

Reference herein to "one example" or "one aspect" means that one or more feature, structure, or characteristic described in connection with the example or aspect is included in at least one implementation. The phrase "one example" or "one aspect" in various places in the specification may or may not be referring to the same example or aspect.

Unless otherwise indicated, the terms "first," "second," "third," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

Referring to FIGS. 1 and 6, the aspects of the present disclosure provide for the diagnosis and prognosis of an environmental control system 630 of a vehicle 100 that is adapted to both new (e.g., during initial installation in the manufacture of a vehicle 100) and existing (e.g., retrofitted to a vehicle 100 already in service) environmental control systems. The diagnosis and prognosis system 160 described herein requires no intrusive modifications to existing environmental control systems 630 when the existing environmental control systems 630 are retrofitted and allows for diagnosis and prognosis to the component level of the environmental control system 630. Diagnosis and prognosis of, for example, fan failures, heat exchanger blockage, and valve abnormalities or malfunctions are possible which will result in fewer delays and downtime of the vehicle 100. In accordance with the aspects of the present disclosure, a single sensing unit, such as an imaging unit 150, may be used to observe more than one environmental control system subsystem. In other aspects, one or more imaging units 150 are placed for observing respective portions of the environmental control system 630. For example, each subsystem may have a respective imaging unit 150. Images captured by the imaging unit 150 register, such as in controller 120, a dynamic feature of a dynamic predetermined characteristic of at least one portion of the environmental control system 630. The images captured by the imaging unit 150 are analyzed by controller 120 through a pattern recognition algorithm, or other image recognition algorithm, to identify a change in the dynamic feature of the dynamic predetermined characteristic of the at least one portion of the environmental control system 630 so as to provide visual maintenance data that may be used to schedule preventative maintenance on the environmental control system.

Referring to FIGS. 1 and 2, in one aspect of the present disclosure a vehicle 100 includes one or more environmental control systems 630 (FIG. 6). The vehicle 100 is, in one aspect, an aerospace vehicle such as a commercial or military aircraft 602 (FIG. 6) while in other aspects, the vehicle 100 is a commercial or military maritime vessel, a spacecraft or an automobile. In still other aspects, the present disclosure may be applied to heating, ventilation and air conditioning systems of a commercial or residential building. Each of the environmental control systems 630 includes a hot fluid supply 110 and an air conditioning pack 130 connected to the hot fluid supply 110 through a conduit or ducting system 131, that includes flow controls 132 such as valves, of the air conditioning pack 130. The environmental control systems 630 also include various clamps and electrical/signal connectors connected to one or more components of, for example, the air conditioning pack 130. In one aspect, where the vehicle 100 is an aircraft, the hot fluid supply 110 includes bleed air from one or more compressor stages of an engine/propulsion system 634 (FIG. 6) of the vehicle 100. In other aspects, where the vehicle 100 is a maritime vessel, spacecraft or automobile the hot fluid supply may include hot air generated through an interaction of ambient air and an engine component or a heater of the respective vehicle.

The air conditioning pack 130 includes an expansion turbine or air cycle machine 133, a compressor 134, a heat exchanger 135, a water separator 140 and a mixing chamber 141, all of which are connected through the conduit system 131. The heat exchanger includes a fluid circulator 136, such as a fan, a primary heat exchanger 138, a secondary heat exchanger 139 and a cooling fluid supply 137. The cooling fluid supply 137 in one aspect, where the vehicle 100 is an aircraft, is ambient air drawn into the air conditioning pack 130 from an exterior of the vehicle 100. In other aspects, where the vehicle 100 is a maritime surface vessel or automobile the cooling fluid may be ambient air drawn from an exterior of the vehicle. Where the vehicle 100 is a maritime submersible vessel or a spacecraft the cooling fluid may be any closed loop chilled fluid.

FIG. 2 illustrates a representative schematic of, for example, the air conditioning pack 130. For exemplary purposes the conduit system 131 includes conduits 131A-131H. The hot fluid supply 110 is communicably coupled to conduit 131A through valve 132A where the valve 132A is controlled by, for example, controller 120 to provide a predetermined amount of the hot environmental fluid to the air conditioning pack 130. It is noted that the term "environmental" is used herein with respect to the fluid flowing through the environmental control system 630 (FIG. 6) as this is the fluid provided to the passenger cabin. In one aspect the conduit 131A is a bypass conduit that directs hot environmental fluid to a mixing chamber 141 for increasing a temperature of environmental fluid supplied to, for example, the passenger cabin of the vehicle 100. A mixing valve 132B is disposed in the conduit 131A for allowing a predetermined amount of hot environmental fluid through the conduit and directing the hot environmental fluid through conduit 131B, which is communicably connected to conduit 131A. The conduit 131B directs the hot environmental fluid to the primary heat exchanger 138 where the hot environmental fluid is cooled by the cooling fluid from the cooling fluid supply 137. In one aspect, the cooling fluid supply includes a passage or refrigerant tubing system 137P having a ram air inlet 137N at one end and an outlet 137E at the other end. The primary heat exchanger 138, and secondary heat exchanger 139, are disposed within the flow path of the cooling fluid through the passage 137P. While the vehicle 100 is moving, such as during flight and/or taxiing, the cooling fluid is forced into the ram air inlet 137N, through the passage 137P and out of the outlet 137E. While the vehicle 100 is stationary and/or taxiing the cooling fluid is caused to flow through the passage 137P by, for example, the air circulator 136.

The cooled environmental fluid flows from the primary heat exchanger 138 through conduits 131C and 131D to compressor 134 where the cooled environmental fluid is compressed before entering the secondary heat exchanger 139 where the cooled environmental fluid is cooled even further. The cooled environmental fluid exits the secondary heat exchanger 139 through conduit 131F and enters the expansion turbine 133 where the expansion turbine 133 drives and is coupled to the compressor 134 and fluid circulator 136 by a common drive shaft. The cooled environmental fluid passes from the expansion turbine 133 to the water separator 140 through conduit 131G where a humidity of the cooled environmental fluid is adjusted. The water content and/or temperature of the cooled environmental fluid is adjusted by controlling the valve 132C to allow warmer fluid flowing through conduit 131C to enter the water separator and mix with the cooled environmental fluid. In one aspect, the valve allows environmental fluid exiting the primary heat exchanger 138 to mix with environmental fluid exiting the secondary heat exchanger 139. The valve 132C is controlled by, for example, a low limit controller 120L (which in one aspect is part of the controller 120) where the valve is opened and closed to maintain the fluid within the water separator 140 above a predetermined temperature, such as above about 35° F. The cooled environmental fluid passes from the water separate 140 to the mixing chamber 141 where the cooled environmental fluid is mixed with a predetermined amount of recirculated fluid 210 from, for example, the passenger cabin of the vehicle 100 and/or hot supply fluid. Where a temperature of the environmental fluid supplied to the passenger cabin needs to be increased, the mixing valve 132B is opened under the control of, for example, the controller 120 to allow the hot supply fluid to mix with the cooled environmental fluid in the mixing chamber 141 before the conditioned environmental fluid 220 is provided to the passenger cabin from the mixing chamber 141.

The diagnosis and prognosis system 160 includes one or more imaging units 150, such as video cameras, and a controller 120. In other aspects the imaging units 150 include still cameras that capture single images, thermal imagers or other imaging devices capable of detecting icing/frost, particles, malfunctioning or degradated components/subsystems and blockages. In one aspect, each of the imaging units 150 has a predetermined image capture rate (frames/second) and/or predetermined resolution to detect or effect a determination of, for example, a rotational speed and/or eccentricity of a component of the environmental control system 630 (FIG. 6), foreign object presence and/or external particles on a component of the environmental control system 630, a size of the foreign object and/or external particles, and/or frost and/or icing conditions on a component of the environmental control system 630. In one aspect the images are video images while in other aspects the images are still images that are captured periodically (e.g. every 10 milliseconds, every second, every minute, or at any other suitable interval). In one aspect, the imaging units 150 are placed relative to the environmental control system 630 (FIG. 6) where each of the imaging units 150 captures real time images of at least one portion of the environmental control system 630, where real time means the video and/or still image captures are provided to the controller 120 substantially simultaneously with the time the video image captures are taken, e.g. a live video feed (or live feed with respect to still images). For example, imaging unit 150A is positioned relative to or within the air conditioning pack 130 and has a field of view FOV1 sized to capture real time images of one or more of the valves 132A, 132B, 132C and at least a portion of the conduit system 131 along with, for example, associated clamps and electrical/signal connectors. In other aspects, an imaging unit 150 is provided for each respective valve 132A, 132B, 132C. A normal condition mode of each valve is established by the diagnosis and prognosis system 160 and stored in a memory 120M of the controller 120 as a respective stored image 180 (FIG. 1). In one aspect the stored image 180 is obtained at the installation or replacement of each valve and includes an image of the respective valve in a predetermined operational position corresponding to a respective normal condition mode. In one aspect, the normal condition mode of the valve, such as valves 132A and 132C, is a position where the valve is opened by a predetermined amount while a normal condition mode of the mixing valve 132B is a position where the mixing valve 132B is closed. In other aspects the normal condition mode of the valves 132A, 132B, 132C may be any suitable position between fully opened and fully closed. In one aspect, the field of view FOV1 of the imaging unit 150A is sized to capture, in addition to the valves 132A, 132B, 132C, real time images of one or more of the compressor 134, the expansion turbine 133, the water separator 140 the mixing chamber 141 and one or more of the conduits 131A-131H. The imaging unit 150A may effect a determination of the presence of icing or frost on one or more of the compressor 134, the expansion turbine 133, the water separator 140 the mixing chamber 141 and one or more of the conduits 131A-131H. In one aspect the stored images 180 also include thresholding operating parameter images of respective environmental control system components that effect a determination by the controller 120, through image analysis that the real time video image captures exceed the threshold indicated by the thresholding operating parameter images, a malfunction occurred or is about to occur.

In one aspect, imaging unit 150B is positioned relative to or within the air conditioning pack 130 and has a field of view FOV2 sized to capture real time images of the fluid circulator 136. In one aspect, the imaging unit 150B has an image capture rate that is fast enough to effect a determination of a rotational speed and/or eccentricity of the fluid circulator 136 when the real time images of the fluid circulator 136 are analyzed by the controller 120. The imaging unit 150B also includes a resolution to detect the presence of foreign objects and/or external particles on the fluid circulator 136 as well as a size of the foreign objects and/or external particles. A normal condition mode of fluid circulator 136 is established by the diagnosis and prognosis system 160 and stored in the memory 120M of the controller 120 as a respective stored image 180. In one aspect the stored image 180 is obtained at the installation or replacement of the fluid circulator 136 and in one aspect includes at least one image of the fluid circulator 136 in a predetermined operational position corresponding to a respective normal condition mode. In one aspect, one of the stored images 180 of the fluid circulator 136 corresponds to an initial runout (e.g. movement or wobble) of the fluid circulator 136 at a predetermined operation speed. In one aspect, another of the stored images 180 of the fluid circulator 136 corresponds to the fluid circulator 136 being free from foreign objects and/or external particles. In still other aspects, one or more of the stored images 180 corresponds to a rotational speed of the fluid circulator 136.

The imaging unit 150C is positioned relative to or within the air conditioning pack 130 and has a field of view FOV3 sized to capture real time images of one or more of the primary heat exchanger 138 and the secondary heat exchanger 139 and the passage or ducting 137P. The imaging unit 150C includes a resolution to detect the presence of foreign objects and/or external particles on the primary heat exchanger 138 and the secondary heat exchanger 139 as well as a size of the foreign objects and/or external particles. The imaging unit 150C also effects the determination of the presence of frost or icing on the primary heat exchanger 138 and the secondary heat exchanger 139. A normal condition mode of each of the primary heat exchanger 138 and the secondary heat exchanger 139 is established by the diagnosis and prognosis system 160 and stored in the memory 120M of the controller 120 as a respective stored image 180. In one aspect the stored image 180 is obtained at the installation or replacement of each of the primary heat exchanger 138 and the secondary heat exchanger 139 and includes an image of each of the primary heat exchanger 138 and the secondary heat exchanger 139 in a predetermined operational position corresponding to a respective normal condition mode. In one aspect, the stored image(s) 180 of the primary heat exchanger 138 and the secondary heat exchanger 139 corresponds to the primary heat exchanger 138 and the secondary heat exchanger 139 being free from foreign objects and/or external particles. In one aspect, the imaging unit 150C also effects detection of foreign objects and/or external particles in the passage 137P where the normal condition mode of the passage 137P is when the passage 137P is free from foreign objects and/or external particles. In a manner similar to that described above with respect to the primary heat exchanger 138 and secondary heat exchanger 139, stored images 180 of the passage 137P are stored in the memory 120M for comparison with real time images of the passage 137P provided by the imaging unit 150C.

In one aspect, the various clamps and electrical/signal connectors of the environmental control systems 630 (or any other system of the vehicle 100) may also have associated normal condition modes that are stored as images in the memory 120M in a manner substantially similar to that described above. The stored images of the various clamps (and/or other fasteners) and electrical/signal connectors taken are compared with real time images of the various clamps and electrical/signal connectors provided by one or more of the imaging units 150 to determine if an abnormal condition exists in a manner substantially similar to that described herein with respect to the other components of the environmental control systems 630.

The controller 120 includes suitable programming code and structure to effect image analysis of the real time images of the environmental control system 630 (FIG. 6) components. For example, in one aspect, the controller 120 includes a pattern recognition algorithm and corresponding structure to effect a comparison between the real time video image captures of each of the environmental control system 630 (FIG. 6) components and their respective stored images 180, where the stored images 180 are still images and/or video images. For example, vibrations and/or maintenance personnel may cause one or more of the valves 132A, 132B, 132C to be in an incorrect position or a seal of one or more of the valves 132A, 132B, 132C may be deteriorated causing fluid to escape the valve. The controller 120 compares the real time images of one or more of the valves 132A, 132B, 132C with the respective stored images 180 and includes suitable program code to generate a report 300 or cause an aural or visual indication in the vehicle 100 (for the vehicle crew) that indicates the incorrect position of the valve 132A, 132B, 132B and/or indicating a leak in the valve 132A, 132B, 132C.

In one aspect, the report 300 includes visual evidence of trends or any deviation above a predetermined threshold from the normal condition mode represented by the respective stored image. The predetermined threshold depends on the environmental control system component being monitored. For example, with respect to the primary heat exchanger 138, the secondary heat exchanger 139 and/or the passage 137P a predetermined threshold may be a predetermined foreign object debris or external particle size and/or percent coverage (e.g. blockage) caused by the foreign object debris, external particles, icing and/or frost. With respect to the valves, the predetermined threshold may be a predetermined amount of deviation of a respective valve control handle/lever from the normal condition mode. With respect to the fluid circulator the predetermined threshold may be a deviation of the rotational speed from a rotational speed corresponding to the normal condition mode and/or an amount of fan movement (e.g. runout) from the normal condition mode. With respect to the conduit system 131 the predetermined threshold may be a percent coverage of frost and/or icing along the conduits 131A-131H.

Referring now to FIG. 3, in one aspect the report 300 includes one or more of an image of an environmental control system component (such as those described herein), a trending graph 320, an indication of foreign object debris and/or particle size 330 on or in a respective environmental control system component, an indication of foreign object debris and/or external particle percent coverage 340 on or in a respective environmental control system component, an indication of icing and/or frost 350 which in one aspect includes a percent coverage of the icing and/or frost, a diagnosis 360 of environmental control system component malfunction and a prognosis 370 of when a malfunction will occur or maintenance is required for a respective environmental control system component. In one aspect, the trending graph 320 is illustrated as a line graph for exemplary purposes while in other aspects any suitable visual indicator of trends may be presented. In one aspect the trending graph 320 includes a Y axes indicative of a value such as percent blockage (or any other thresholding value indicated above), a X axis indicative of a time period, a threshold indicator 321 and a trending indicator 322. In one aspect, the real time video image captures from the imaging units 150A-150C are stored in memory 120M where the trending indicator is a combination of past data (e.g. the stored real time video image captures or data derived therefrom) obtained from the image analysis of the controller 120 and predicted data generated by the controller 120 based on the past data. In one aspect the trending graph effects a visual prognosis of when a malfunction will occur, such as where the trending indicator 322 crosses the threshold indicator 321. The image of the environmental control system component 310 is in one aspect an image of the environmental control system component in a deviated mode to indicate the deviation of the environmental control system component from the normal condition mode. The image of the environmental control system component 310 corresponds to and/or supplements, in one aspect, to the diagnosis 360 of a malfunction of the environmental control system 630 (FIG. 6). The diagnosis 360 is based on, for example, the identification of changes or variations in the dynamic feature being observed between the real time video image captures of the environmental control system components in (e.g. during) operation and the respective normal condition modes of the environmental control system components in (e.g. during) operation. The identified change(s) in the dynamic feature are determined by the controller 120 based on the comparison between the real time video image captures of the environmental control system components and the respective normal condition modes of the environmental control system components. Where an abnormality or malfunction has not occurred a prognosis 370 is included in the report 300 to indicate or predict when the abnormality or malfunction may or is expected to occur based on, for example, the identified change(s) in the dynamic feature determined by the controller 120 which are based on the comparison between the real time video image captures of the environmental control system components and the respective normal condition modes of the environmental control system components.

Referring now to FIGS. 1, 2, 4 and 6 and exemplary operation will be described for the diagnosis and prognosis system 160 described herein. In one aspect, at least one imaging unit 150 is provided to oversee one or more portions of the environmental control system 630 of the vehicle 100 as described herein when the environmental control system is in operation. Imaging of at least one portion of the environmental control system 630, during operation, with the at least one imaging unit 150, is conducted in real time (FIG. 4, Block 400) to provide a real time video image capture (or in other aspects, still image capture) of respective ones of the one or more portions of the environmental control system 630. In one aspect, the real time image captures of the one or more portions of the environmental control system 630, during operation, are stored in the memory 120M. In one aspect, a normal condition video mode image capture is established for each of the one or more portions of the environmental control system 630 during operation and stored in the memory 120M as the stored images 180. As described herein, in one aspect, the stored images 180 include threshold operating parameter images of the one or more portions of the environmental control system 630. The real time video image captures (or in other aspects, still images) for each of the one or more portions of the environmental control system 630 are compared, by the controller 120, to a respective stored image 180 (e.g., the respective normal condition mode) (FIG. 4, Block 410) using the pattern recognition algorithm to identify or determine the existence of an abnormality or malfunction of the one or more portions of the environmental control system 630 (FIG. 4, Block 420). For example, the controller 120 determines and/or identifies at least one or more of (e.g. changes in the dynamic feature of the dynamic predetermined characteristic of at least one portion of the environmental control system 630):

a presence of one or more of foreign object debris and external particles on the at least one portion of the environmental control system, such as the fluid circulator 136, the primary heat exchanger 138, the secondary heat exchanger 139 and the passage or duct 137P;

a size of the one or more of the foreign object debris and the external particles;

a variation in fluid circulator 136 movement and/or rotational speed/angular velocity relative to a predetermined operational threshold, e.g. an allowed deviation from the stored image (e.g., normal condition mode);

a variation in valve position relative to a predetermined valve position indicated by the stored image (e.g., the normal condition mode); and a presence of one or more of frost and icing on the passage or duct 137P (e.g. the refrigerant tubing system), the conduit system 131, the primary heat exchanger 138, the secondary heat exchanger 139 and/or the water separator 140.

In other aspects, the changes in the dynamic feature of the dynamic predetermined characteristic of at least one portion of the environmental control system 630 may include any suitable operational parameters associated with the environmental control system 630. In one aspect the controller generates a diagnostic and/or prognostic report (FIG. 4, Block 430) that includes, for example, trends of the identified change(s) in the dynamic feature or a deviation of the identified change(s) in the dynamic feature above a predetermined threshold from a predetermined operating condition of the at least one portion of the environmental control system 630. In one aspect, as described herein the report includes visual representations of one or more of the trends and the deviation. In one aspect, the report includes a prognosis or diagnosis for required maintenance of the at least one portion of the environmental control system 630 based on the identified change(s) in the dynamic feature.

The disclosure and drawing figures describing the operations of the method(s) set forth herein should not be interpreted as necessarily determining a sequence in which the operations are to be performed. Rather, although one illustrative order is indicated, it is to be understood that the sequence of the operations may be modified when appropriate. Accordingly, certain operations may be performed in a different order or simultaneously. Additionally, in some aspects of the disclosure, not all operations described herein need be performed.

Examples of the disclosure may be described in the context of an aircraft manufacturing and service method 500 as shown in FIG. 5 and an aircraft 602 as shown in FIG. 6. During pre-production, illustrative method 500 may include specification and design 504 of the aircraft 602 and material procurement 506 which in one aspect includes placement and integration of the diagnosis and prognosis system 160 described herein. During production, component and subassembly manufacturing 508 and system integration 510 of the aircraft 602 take place during which the diagnosis and prognosis system 160 may be installed. Thereafter, the aircraft 602 may go through certification and delivery 512 to be placed in service 514. While in service by a customer, the aircraft 602 is scheduled for routine maintenance and service 516 (which may also include modification, reconfiguration, refurbishment, and so on where if not already equipped, the diagnosis and prognosis system 160 may be installed in the aircraft 602).

Processes of the illustrative method 500 may be performed or carried out by a system integrator, a third party, and/or an operator (e.g., a customer). For the purposes of this description, a system integrator may include, without limitation, any number of aircraft manufacturers and major-system subcontractors; a third party may include, without limitation, any number of vendors, subcontractors, and suppliers; and an operator may be an airline, leasing company, military entity, service organization, and so on.

As shown in FIG. 6, the aircraft 602 produced by the illustrative method 500 may include a plurality of high-level systems and an interior 622. Examples of high-level systems, which are distributed throughout the aircraft, include one or more of a propulsion system 624, an electrical power system 626, a hydraulic system 628, and the environmental control system 630 where the environmental system includes the diagnosis and prognosis system 160 described herein. Any number of other systems may be included. Although an aerospace example is shown, the principles of the invention may be applied to other industries that include or use vehicles with environmental control systems, such as the marine and automotive industries. In other aspects the principles of the invention may be applied to building (residential or commercial) air conditioning systems.

Apparatus and methods shown or described herein may be employed during any one or more of the stages of the manufacturing and service method 500. For example, components or subassemblies corresponding to component and subassembly manufacturing 508 may be fabricated or manufactured in a manner similar to components or subassemblies produced while the aircraft 602 is in service. Also, one or more aspects of the apparatus, method, or combination thereof may be utilized during the production states 508 and 510, for example, by substantially expediting assembly of or reducing the cost of an aircraft 602.

Different examples and aspects of the apparatus and methods are disclosed herein that include a variety of components, features, and functionality. It should be understood that the various examples and aspects of the apparatus and methods disclosed herein may include any of the components, features, and functionality of any of the other examples and aspects of the apparatus and methods disclosed herein in any combination, and all of such possibilities are intended to be within the spirit and scope of the present disclosure.

Many modifications and other examples of the disclosure set forth herein will come to mind to one skilled in the art to which the disclosure pertains having the benefit of the teachings presented in the foregoing descriptions and the associated drawings.

In one or more aspects of the present disclosure, a method to provide prognosis and diagnosis of environmental control system maintenance comprises imaging, with at least one imaging unit, in real time at least one portion of an environmental control system in operation, wherein real time images register a dynamic feature of a dynamic predetermined characteristic of the at least one portion of the environmental control system; comparing, with a controller, the real time images of the at least one portion of the environmental control system with stored images of the at least one portion of the environmental control system in operation to identify a change in the dynamic feature of the dynamic predetermined characteristic of the at least one portion of the environmental control system; and determining, with the controller, whether an abnormality exists in the at least one portion of the environmental control system based on the identified change in the dynamic feature between the real time images and the stored images of the at least one portion of the environmental control system.

In one or more aspects of the present disclosure, the at least one portion of the environmental control system includes one or more of a heat exchanger, a fan system, a valve, a refrigerant tubing system and a ducting system.

In one or more aspects of the present disclosure, the method further comprises storing the real time images in a memory coupled to the controller.

In one or more aspects of the present disclosure, the stored images include threshold operating parameter images of the at least one portion of the environmental control system that are stored in a memory coupled to the controller.

In one or more aspects of the present disclosure, determining whether an abnormality exists includes pattern recognition between the real time images and stored images of the at least one portion of the environmental control system.

In one or more aspects of the present disclosure, determining whether an abnormality exists includes identifying a presence of one or more of foreign object debris and external particles on the at least one portion of the environmental control system.

In one or more aspects of the present disclosure, the method further comprises determining a size of the one or more of the foreign object debris and the external particles.

In one or more aspects of the present disclosure, the at least one portion of the environment control system is a ducting system.

In one or more aspects of the present disclosure, the at least one portion of the environmental control system is a fan and determining whether an abnormality exists includes identifying a change in in fan movement relative to a predetermined operational threshold.

In one or more aspects of the present disclosure, the at least one portion of the environmental control system is a valve and determining whether an abnormality exists includes identifying a change in valve position relative to a predetermined valve position.

In one or more aspects of the present disclosure, the at least one portion of the environmental control system is a refrigerant tubing system and determining whether an abnormality exists includes identifying a presence of one or more of frost and icing on the refrigerant tubing system.

In one or more aspects of the present disclosure, the method further comprises providing a report including trends of the identified change in the dynamic feature or a deviation of the identified change in the dynamic feature above a predetermined threshold from a predetermined operating condition of the at least one portion of the environmental control system.

In one or more aspects of the present disclosure, the report includes visual representations of one or more of the trends and the deviation.

In one or more aspects of the present disclosure, the method further comprises generating a prognosis or diagnosis for required maintenance of the at least one portion of the environmental control system based on the identified change in the dynamic feature.

In one or more aspects of the present disclosure, the at least one portion of the environmental control system is onboard an aircraft.

In one or more aspects of the present disclosure, an apparatus to provide prognosis and diagnosis of environmental control system maintenance comprises at least one imaging unit configured to capture real time images of at least one portion of an environmental control system in operation, where the real time images register a dynamic feature of a dynamic predetermined characteristic of the at least one portion of the environmental control system; and a controller connected to the at least one imaging unit, the controller being configured to compare the real time images of the at least one portion of the environmental control system with stored images of the at least one portion of the environmental control system in operation to identify a change in the dynamic feature of the dynamic predetermined characteristic of the at least one portion of the environmental control system, and determine whether an abnormality exists in the at least one portion of the environmental control system based on the identified change in the dynamic feature between the real time images and the stored images of the at least one portion of the environmental control system.

In one or more aspects of the present disclosure, the environmental control system is an aircraft environmental control system.

In one or more aspects of the present disclosure, the controller is configured to generate a prognosis or diagnosis for required maintenance of the at least one portion of the environmental control system based on the identified change in the dynamic feature.

In one or more aspects of the present disclosure, the controller is configured to generate a report including trending of the abnormality.

In one or more aspects of the present disclosure, the controller is configured to generate a report indicating a deviation of the abnormality above a predetermined operational threshold of the at least one portion of the environmental control system.

In one or more aspects of the present disclosure, the at least one imaging unit is a video camera.

In one or more aspects of the present disclosure, an aircraft environmental control system diagnostic system comprises at least one video imaging unit disposed within the aircraft and being configured to capture real time images of at least one portion of an environmental control system, in operation, disposed within the aircraft, where the real time images register a dynamic feature of a dynamic predetermined characteristic of the at least one portion of the environmental control system; a memory including stored images of the at least one portion of the environmental control system in operation, the stored images corresponding to predetermined operational conditions of the at least one portion of the environmental control system; and a controller connected to the at least one video imaging unit and the memory, the controller being configured to compare the real time images of the at least one portion of the environmental control system with the stored images to identify a change in the dynamic feature of the dynamic predetermined characteristic of the at least one portion of the environmental control system, and determine whether an abnormality exists in the at least one portion of the environmental control system based on the identified change in the dynamic feature between the real time images and the stored images.

In one or more aspects of the present disclosure, the controller is configured to generate a prognosis or diagnosis for required maintenance of the at least one portion of the environmental control system based on the identified change in the dynamic feature.

In one or more aspects of the present disclosure, the controller is configured to generate a report including trending of the abnormality.

In one or more aspects of the present disclosure, the controller is configured to generate a report indicating a deviation of the abnormality above a predetermined operational threshold of the at least one portion of the environmental control system.

Therefore, it is to be understood that the disclosure is not to be limited to the specific embodiments disclosed and that modifications and other embodiments are intended to be included within the scope of the appended claims. Moreover, although the foregoing descriptions and the associated drawings describe example embodiments in the context of certain illustrative combinations of elements and/or functions, it should be appreciated that different combinations of elements and/or functions may be provided by alternative implementations without departing from the scope of the appended claims.

What is claimed is:

1. A method to provide prognosis and diagnosis of passenger cabin environmental control system maintenance, the method comprising:
    imaging, with at least one imaging unit, in real time at least one portion of a passenger cabin environmental control system in operation, wherein real time images register a dynamic feature of a dynamic predetermined characteristic of the at least one portion of the environmental control system;
    comparing, with a controller, the real time images of the at least one portion of the passenger cabin environmental control system with stored images of the at least one portion of the passenger cabin environmental control system in operation to identify a change in the dynamic feature of the dynamic predetermined characteristic of the at least one portion of the passenger cabin environmental control system; and
    determining, with the controller, whether an abnormality exists in the at least one portion of the passenger cabin environmental control system based on the identified change in the dynamic feature between the real time images and the stored images of the at least one portion of the passenger cabin environmental control system.

2. The method of claim 1, wherein the at least one portion of the passenger cabin environmental control system includes one or more of a heat exchanger, a fan system, a valve, a refrigerant tubing system and a ducting system.

3. The method of claim 1, wherein the stored images include threshold operating parameter images of the at least one portion of the passenger cabin environmental control system that are stored in a memory coupled to the controller.

4. The method of claim 1, wherein determining whether an abnormality exists includes pattern recognition between the real time images and stored images of the at least one portion of the passenger cabin environmental control system.

5. The method of claim 1, wherein determining whether an abnormality exists includes identifying a presence of one or more of foreign object debris and external particles on the at least one portion of the passenger cabin environmental control system.

6. The method of claim 1, wherein the at least one portion of the passenger cabin environmental control system is a fan and determining whether an abnormality exists includes identifying a change in in fan movement relative to a predetermined operational threshold.

7. The method of claim 1, wherein the at least one portion of the passenger cabin environmental control system is a valve and determining whether an abnormality exists includes identifying a change in valve position relative to a predetermined valve position.

8. The method of claim 1, wherein the at least one portion of the passenger cabin environmental control system is a refrigerant tubing system and determining whether an abnormality exists includes identifying a presence of one or more of frost and icing on the refrigerant tubing system.

9. The method of claim 1, further comprising providing a report including trends of the identified change in the dynamic feature or a deviation of the identified change in the dynamic feature above a predetermined threshold from a predetermined operating condition of the at least one portion of the passenger cabin environmental control system.

10. The method of claim 1, further comprising generating a prognosis or diagnosis for required maintenance of the at least one portion of the passenger cabin environmental control system based on the identified change in the dynamic feature.

11. The method claim 1, wherein the at least one portion of the passenger cabin environmental control system is onboard an aircraft.

12. An apparatus to provide prognosis and diagnosis of passenger cabin environmental control system maintenance, the apparatus comprising:
at least one imaging unit configured to capture real time images of at least one portion of a passenger cabin environmental control system in operation, where the real time images register a dynamic feature of a dynamic predetermined characteristic of the at least one portion of the passenger cabin environmental control system; and
a controller connected to the at least one imaging unit, the controller being configured to
compare the real time images of the at least one portion of the passenger cabin environmental control system with stored images of the at least one portion of the passenger cabin environmental control system in operation to identify a change in the dynamic feature of the dynamic predetermined characteristic of the at least one portion of the passenger cabin environmental control system, and
determine whether an abnormality exists in the at least one portion of the passenger cabin environmental control system based on the identified change in the dynamic feature between the real time images and the stored images of the at least one portion of the passenger cabin environmental control system.

13. The apparatus of claim 12, wherein the passenger cabin environmental control system is an aircraft passenger cabin environmental control system.

14. The apparatus of claim 12, wherein the controller is configured to generate a prognosis or diagnosis for required maintenance of the at least one portion of the passenger cabin environmental control system based on the identified change in the dynamic feature.

15. The apparatus of claim 14, wherein the controller is configured to generate a report including trending of the abnormality.

16. The apparatus of claim 14, wherein the controller is configured to generate a report indicating a deviation of the abnormality above a predetermined operational threshold of the at least one portion of the passenger cabin environmental control system.

17. An aircraft passenger cabin environmental control system diagnostic system comprising:
at least one video imaging unit disposed within the aircraft and being configured to capture real time images of at least one portion of a passenger cabin environmental control system, in operation, disposed within the aircraft, where the real time images register a dynamic feature of a dynamic predetermined characteristic of the at least one portion of the passenger cabin environmental control system;
a memory including stored images of the at least one portion of the passenger cabin environmental control system in operation, the stored images corresponding to predetermined operational conditions of the at least one portion of the passenger cabin environmental control system; and
a controller connected to the at least one video imaging unit and the memory, the controller being configured to
compare the real time images of the at least one portion of the passenger cabin environmental control system with the stored images to identify a change in the dynamic feature of the dynamic predetermined characteristic of the at least one portion of the passenger cabin environmental control system, and
determine whether an abnormality exists in the at least one portion of the passenger cabin environmental control system based on the identified change in the dynamic feature between the real time images and the stored images.

18. The apparatus of claim 17, wherein the controller is configured to generate a prognosis or diagnosis for required maintenance of the at least one portion of the passenger cabin environmental control system based on the identified change in the dynamic feature.

19. The apparatus of claim 18, wherein the controller is configured to generate a report including trending of the abnormality.

20. The apparatus of claim 18, wherein the controller is configured to generate a report indicating a deviation of the abnormality above a predetermined operational threshold of the at least one portion of the passenger cabin environmental control system.

* * * * *